US012768517B2

(12) United States Patent
Shu

(10) Patent No.: US 12,768,517 B2
(45) Date of Patent: Oct. 20, 2026

(54) NEW-TYPE LAMPSHADE

(71) Applicant: Hangzhou Zixuan Optoelectronic Technology Co., Ltd., Zhejiang (CN)

(72) Inventor: Tongpu Shu, Zhejiang (CN)

(73) Assignee: Hangzhou Zixuan Optoelectronic Technology Co., Ltd., Zhejiang (CN)

( * ) Notice: Subject to any disclaimer, the term of this patent is extended or adjusted under 35 U.S.C. 154(b) by 0 days.

(21) Appl. No.: 19/335,048

(22) Filed: Sep. 22, 2025

(65) Prior Publication Data

US 2026/0029109 A1 Jan. 29, 2026

(30) Foreign Application Priority Data

Jul. 23, 2024 (CN) ........................ 202421748947.6

(51) Int. Cl.

| | |
|---|---|
| ***F21V 17/16*** | (2006.01) |
| ***F21V 1/08*** | (2006.01) |
| ***F21V 1/16*** | (2018.01) |
| ***F21V 1/26*** | (2006.01) |
| ***F21V 17/00*** | (2006.01) |

(52) U.S. Cl.

CPC ............. *F21V 17/007* (2013.01); *F21V 1/08* (2013.01); *F21V 1/16* (2013.01); *F21V 1/26* (2013.01); *F21V 17/164* (2013.01)

(58) Field of Classification Search

CPC ........ F21V 17/007; F21V 1/06; F21V 17/164; F21V 1/143; F21V 1/26; F21V 17/002; F21V 1/00; F21V 1/12; F21V 17/06; B32B 21/06; B32B 1/08; B32B 27/10

USPC ................ 362/320, 332, 351, 352, 358, 360

See application file for complete search history.

(56) References Cited

U.S. PATENT DOCUMENTS

| | | | | |
|---|---|---|---|---|
| 3,023,307 A * | 2/1962 | Okamoto | F21V 1/06 | 362/358 |
| 3,787,676 A * | 1/1974 | Korach | F21V 1/06 | 362/352 |
| 4,383,291 A * | 5/1983 | Gall | F21V 1/06 | 362/450 |
| 2005/0111228 A1* | 5/2005 | Chen | F21V 17/007 | 362/352 |
| 2018/0340670 A1* | 11/2018 | Guarro Agustí | B32B 27/10 | |

* cited by examiner

*Primary Examiner* — Omar Rojas Cadima

(74) *Attorney, Agent, or Firm* — Hawaii Patent Services; Nathaniel K. Fedde; Kenton N. Fedde

(57) ABSTRACT

The present disclosure relates to a new-type lampshade, comprising a lampshade with a mounting base inside, which is connected to the lampshade through connecting rods. The lampshade consists of a lampshade body and a connection shaping device attached to the lampshade body. The lampshade body is a foldable storage structure made of a flexible material. The connection shaping device comprises a support bracket and a fastener fixed to the lampshade body, where the fastener is a flexible hollow sleeve structure. The support bracket is threaded through the hollow area of the fastener to form a structure that supports and shapes the lampshade body. The connecting rods are uniformly distributed and detachably connected to the support bracket.

20 Claims, 8 Drawing Sheets

NEW-TYPE LAMPSHADE

CROSS-REFERENCE TO RELATED APPLICATIONS

This application claims priority to the Chinese utility model patent application No. 202421748947.6, titled "New-Type Lampshade," filed on Jul. 23, 2024, the content of which, including amendment thereof, is incorporated herein by reference in its entirety.

TECHNICAL FIELD

The present disclosure relates to the technical field of lighting fixtures, particularly to a new-type lampshade.

BACKGROUND

Currently, with the demand for new home renovations, large floor lamps and table lamps are widely used. One of the main accessories for such lighting fixtures is the lampshade. A good lampshade can create a more uniform and soft radiation range, and its design structure can greatly enhance the ambiance of the home environment. However, the connection between the lampshade and the central column requires a connecting structure. Generally, the thin surface of the lampshade inevitably results in inconvenience for connection. Traditional lampshade connecting structures require numerous components to ensure stability, resulting in complex connections that are inconvenient for disassembly and installation.

Chinese Patent No. 202221481176.X, titled "Lampshade," discloses a lampshade that utilizes a cavity hose with an opening to install the support bracket, enabling quick assembly while simplifying the connection structure. However, the cavity hose itself requires a certain level of rigidity, and inserting the support bracket into the opening demands forceful stretching. Since the connection position of the cavity hose is close to the edge, this installation method can easily cause the cavity hose to detach from the lampshade body, reducing installation quality and production efficiency. Moreover, traditional lampshades typically feature a rigid lampshade body, which becomes fixed once assembled. If disassembly or transportation is needed, the bulky structure occupies significant space, making it inconvenient to carry or move.

SUMMARY

The present disclosure provides a new-type lampshade to address the issues raised in the background art.

To achieve the above object of the present disclosure, the present disclosure adopts the following technical solution:

A new-type lampshade comprises a lampshade configured as a hollow structure with openings at either end and provided with a mounting base inside for securing a lighting fixture. The mounting base is connected to the lampshade through connecting rods. The lampshade consists of a lampshade body and a connection shaping device attached to the lampshade body, with the lampshade body being a foldable storage structure made of a flexible material. The connection shaping device comprises a support bracket and a fastener fixed to the lampshade body, and the fastener is a flexible hollow sleeve structure. The support bracket is threaded through a hollow area of the fastener to form a structure that supports and shapes the lampshade body, and the connecting rods are uniformly distributed and detachably connected to the support bracket.

A new-type lampshade comprises a lampshade body made of a flexible material, configured to be in either a folded storage state or an extended use state; a fastener made of a flexible material, fixedly attached to the lampshade body, wherein the fastener defines a hollow channel and has a radial mounting notch for access; a support bracket configured to be detachably threaded through the hollow channel of the flexible fastener through the radial mounting notch, thereby supporting and shaping the lampshade body from the folded storage state to the extended use state; and a connecting rod assembly comprising at least one connecting rod, wherein the connecting rod has a connecting end configured to be operably connected with the support bracket when the support bracket is threaded into the flexible fastener, and the connecting rod assembly is configured to support a lighting fixture.

A new-type lampshade comprises a lampshade body made of a flexible material and foldable for storage; a fastener made of a flexible material and fixedly attached to the lampshade body, wherein the fastener defines a continuously extending hollow channel and is provided with a mounting notch cut along a radial direction thereof; at least one support bracket configured to be detachably threaded through the hollow channel of the flexible fastener through the mounting notch, thereby supporting and shaping the lampshade body; and at least one connecting rod configured to support a lighting fixture. One end of the connecting rod is provided with a connecting end that is configured to be releasably engaged with the support bracket during the process of the support bracket passing through the fastener, enabling the connecting rod to be indirectly supported on the lampshade body through the support bracket.

The beneficial effects of the present disclosure compared to the prior art are:

The structure of the present disclosure is rational and compact. By directly threading the support bracket through the fastener to fix it onto the lampshade body, a connection shaping device is formed, a detachable structure has been designed to achieve an appearance and integrity effect similar to that of traditional fixed lamp shades. During the threading process, the connecting rod is simultaneously installed, improving installation efficiency and ensuring the fastener does not easily detach from the lampshade body, guaranteeing successful installation. This greatly enhances the efficiency and experience during both assembly and maintenance phases. The lampshade body itself is made of a flexible material, significantly reducing space occupancy whether folded for storage or transported, offering excellent mobility and convenience, making it suitable for widespread adoption.

BRIEF DESCRIPTION OF DRAWINGS

The drawings, which form part of this application, are provided to further illustrate the present disclosure. The illustrative embodiments and the descriptions thereof are intended to explain the present disclosure and do not constitute any undue limitation. In the drawings.

Figure 1:
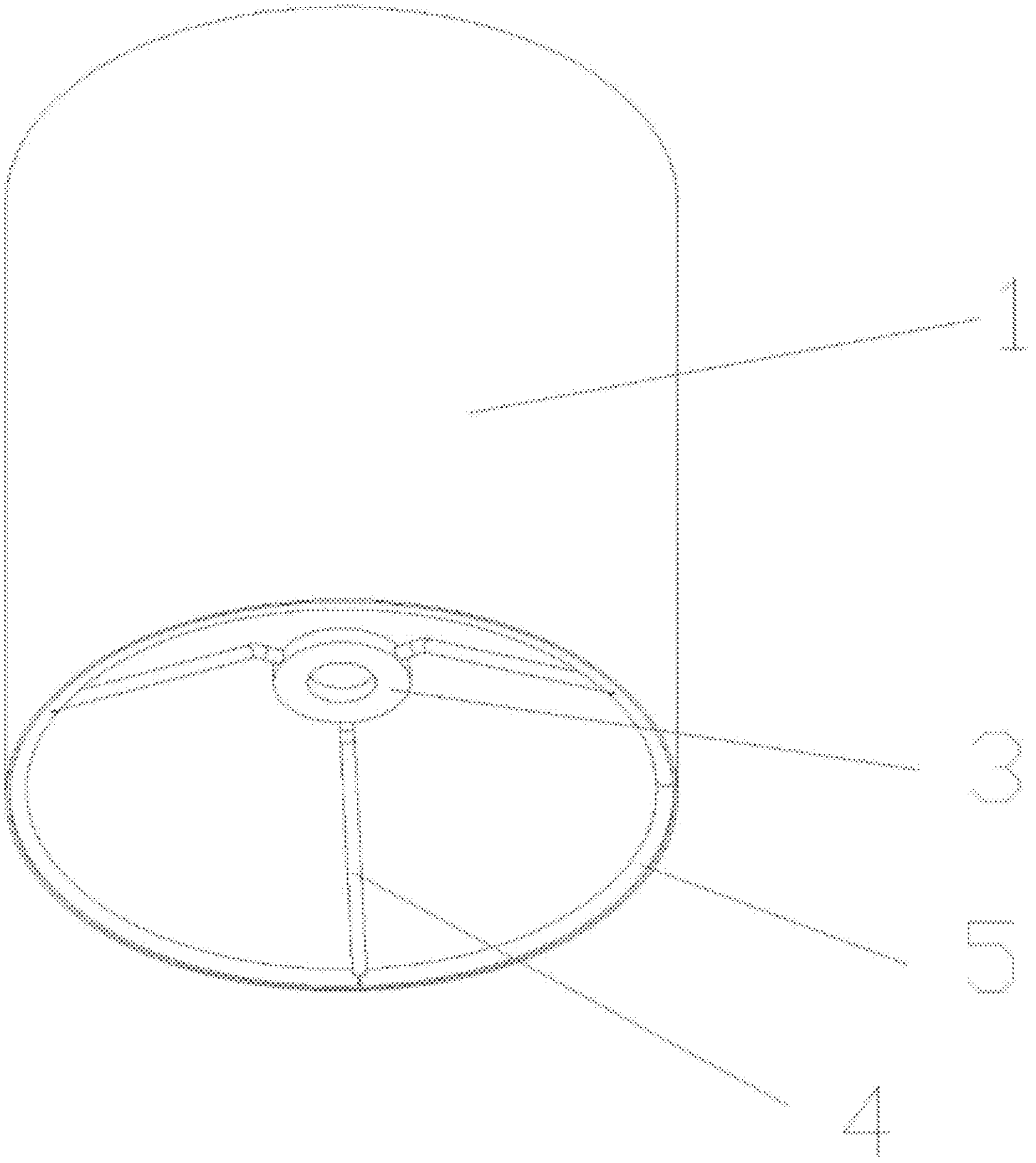
FIG. 1 is a perspective view of an embodiment provided by the present disclosure.

Reference signs: Lampshade body (1); Support bracket (2); Mounting base (3); Connecting rod (4); Fastener (5); Connecting end (6).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the present disclosure, addressing the technical drawbacks of conventional floor or table lamp lampshades—such as their rigid and thin construction hindering reliable connections, complex traditional connecting structures making disassembly difficult and assembly efficiency low, and existing solutions using soft tubes with open cavities, which simplify the structure but require forceful expansion and edge-proximate installation that risks tube detachment, reducing yield and complicating handling—a new-type lampshade is provided. This lampshade integrates a flexible and foldable lampshade body, a flexible hollow fastener arranged on the lampshade body, a detachable support bracket that can be threaded through the fastener, and a combination structure of a mounting base for fixing the lighting fixture and a rotatable connecting rod. This achieves an integrated "storage-shaping-rapid assembly" solution. Below, the specific embodiments of the new-type lampshade of the present disclosure are described in detail with reference to the accompanying drawings.

Figure 3:
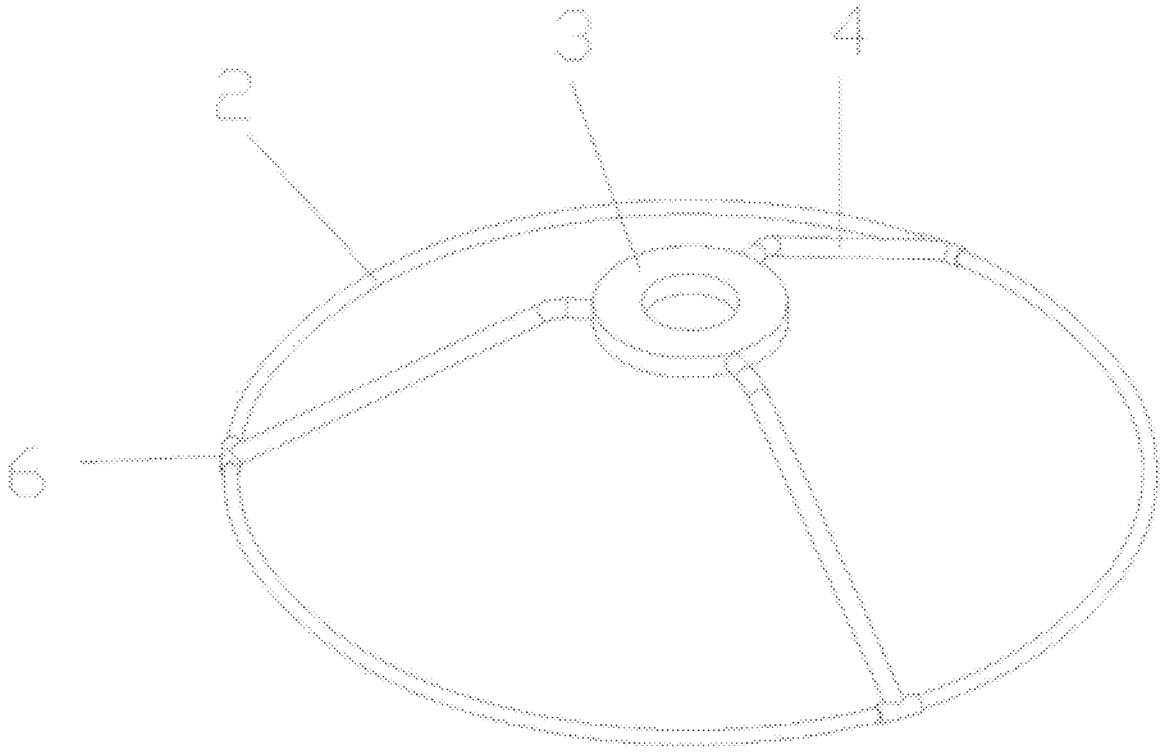
FIG. 3 is a schematic diagram of the connecting structure between the support bracket and the mounting base in the embodiment shown in FIG. 1.

As shown in FIGS. 1 and 3, the present disclosure provides a new-type lampshade, including a hollow-structured lampshade with openings at either the top or bottom. Inside the lampshade is a mounting base 3 for securing the lighting fixture, which is connected to the lampshade through connecting rods 4. The lampshade consists of a lampshade body 1 and a connection shaping device attached to the lampshade body 1. The lampshade body 1 is a foldable storage structure made of a flexible material, capable of transitioning between a folded storage state and an extended use state. The connection shaping device includes a support bracket 2 and fasteners 5 fixed to the lampshade body 1. The fasteners 5 are flexible hollow sleeve structures, and the support bracket 2 is threaded through the hollow area of the fasteners 5 to form a structure that supports and shapes the lampshade body 1 in its extended use state. The connecting rods 4 are uniformly distributed and detachably connected to the support bracket 2.

During the implementation of the present disclosure, the connection between the fasteners and the lampshade body can be achieved in various ways to ensure structural stability and convenience. Preferably, a high-strength adhesive is used to bond the lampshade body 1 and the fasteners 5, enhancing the stability of their connection. This method facilitates production and assembly while offering good flexibility, making it suitable for lampshade bodies of different shapes and materials. In some embodiments, the edge of the lampshade body 1 and the fasteners 5 may be connected through stitching, using high-strength, durable fabric threads to further improve the robustness and durability of the connection. This approach is suitable for larger-sized lampshade bodies, effectively preventing the fasteners from detaching or loosening during use.

In the present disclosure, the connecting rods 4 and the mounting base 3 are integrally and fixedly connected by welding, ensuring a stable support and shaping structure between the mounting base 3 and the connecting rods 4. The connecting rod assembly formed by the connecting rods 4 and the mounting base 3 is used to support the lighting fixture, enabling its stable installation on the lampshade body. In other embodiments, the connecting rods 4 and the mounting base 3 may also adopt a snap-fit detachable connecting structure. The bottom of the mounting base 3 is provided with slots featuring elastic claws at positions corresponding to the connecting rods 4, while the ends of the connecting rods 4 near the mounting base 3 are equipped with annular flanges matching the claws. During assembly, simply aligning and pressing the flanges into the slots causes the elastic claws to automatically snap onto the flanges for fixation. To disassemble, gently prying the claws apart separates the components. This connection method eliminates the need for additional tools, further simplifying the assembly and disassembly process of the mounting base 3 and connecting rods 4, facilitating later maintenance or replacement of individual parts and better accommodating the convenient usage requirements of the flexible lampshade as a whole.

In the present disclosure, the lampshade body 1 itself is made of a flexible material, which significantly reduces the occupied space whether for storage, folding, or transportation, minimizing the difficulty of movement and handling, achieving both compact storage and ease of use. Compared to the method where the support bracket 2 is inserted through an opening in the fastener 5, this technical solution forms a connection shaping device by threading the support bracket 2 through the fastener 5. It simply needs to continuously insert the support bracket along the fastener while simultaneously connecting the connecting rod 4 in coordination. The support bracket 2 directly expands and shapes the flexible lampshade body 1. The entire process is not only fast but also ensures the connection between the mounting base 3 and the lampshade body 1, improving installation efficiency while guaranteeing success rates, significantly enhancing yield and delivering excellent performance. To facilitate single-user assembly, the fit tolerance between the support bracket 2 and the fastener 5 is designed as "easy to insert, hard to accidentally dislodge." In other embodiments, the mating surfaces may feature micro-chamfers and friction-enhancing textures. During assembly, the connecting rod 4 can be temporarily placed at a predetermined position on the support bracket 2, allowing it to align simultaneously as the support bracket 2 advances into the fastener 5. This assembly method significantly reduces skill requirements for assemblers, shortens assembly time, and lowers defect rates. Meanwhile, the flexible lampshade body 1, once expanded, is shaped by the force distribution of the support bracket 2, minimizing localized collapses caused by material weight or movement.

Figure 2:
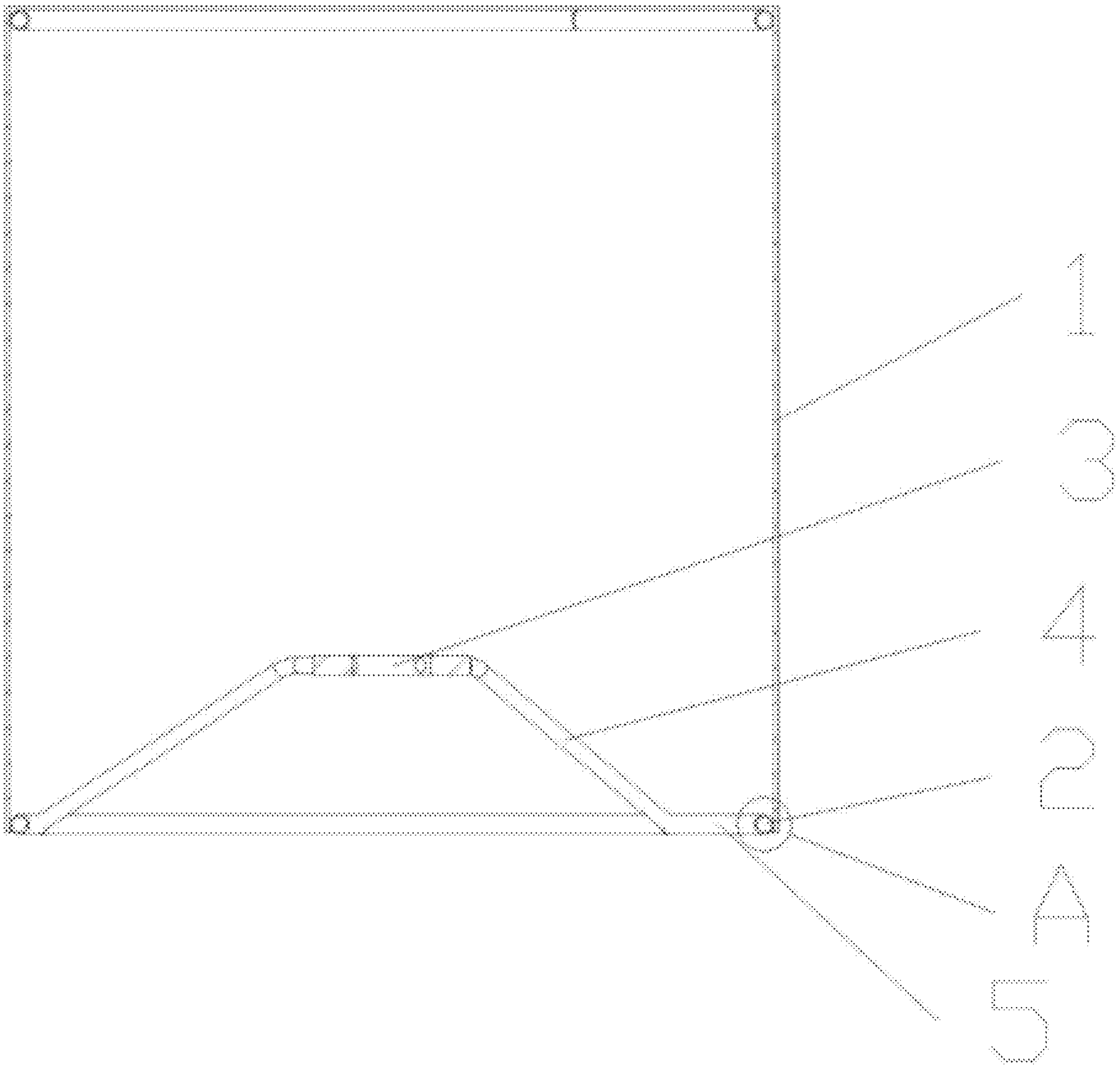
FIG. 2 is a cross-sectional view of the embodiment shown in FIG. 1.
Figure 4:
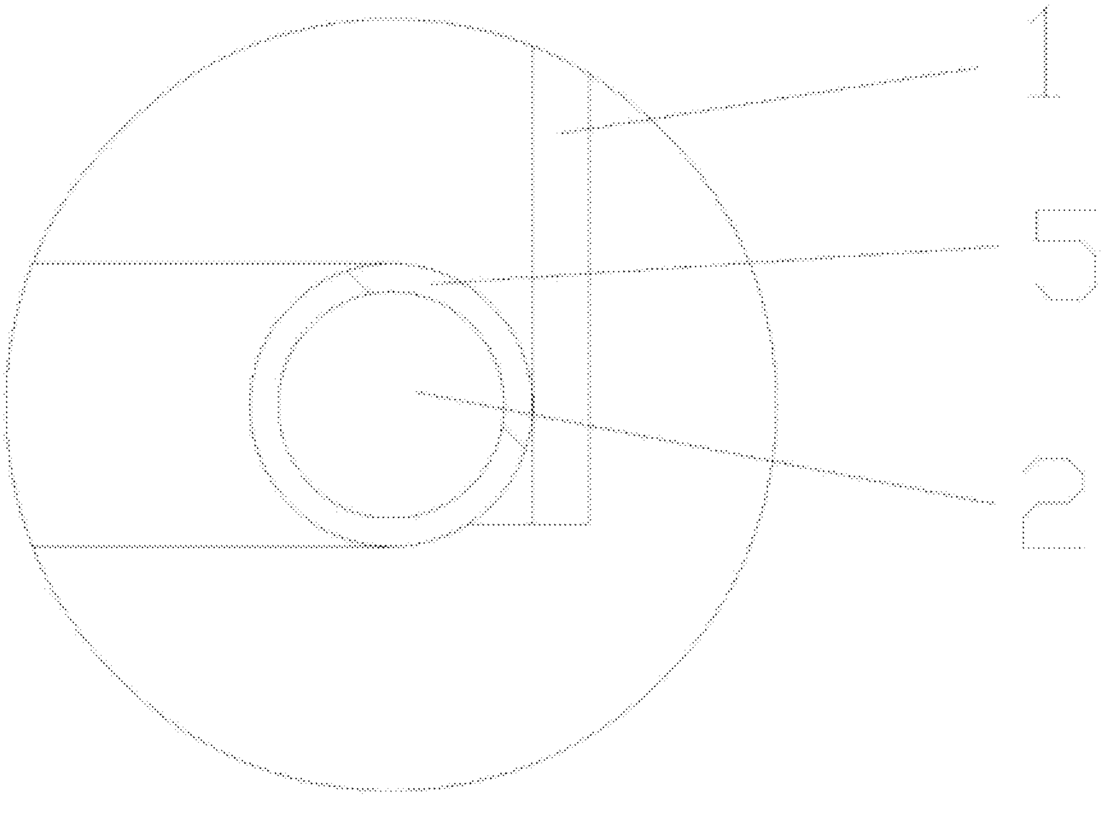
FIG. 4 is a partial enlarged view of section A in FIG. 2.
Figure 5:
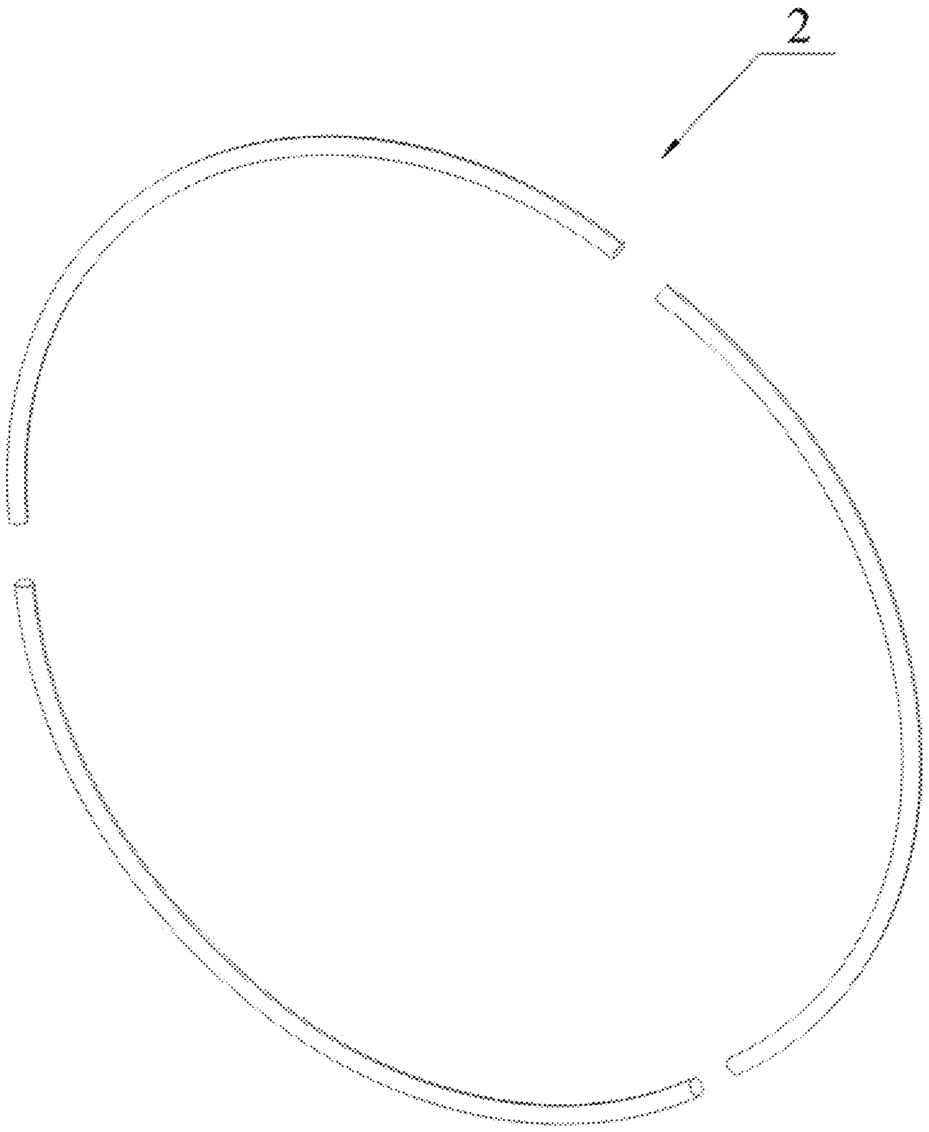
FIG. 5 is another embodiment provided by the present disclosure.
Figure 6:
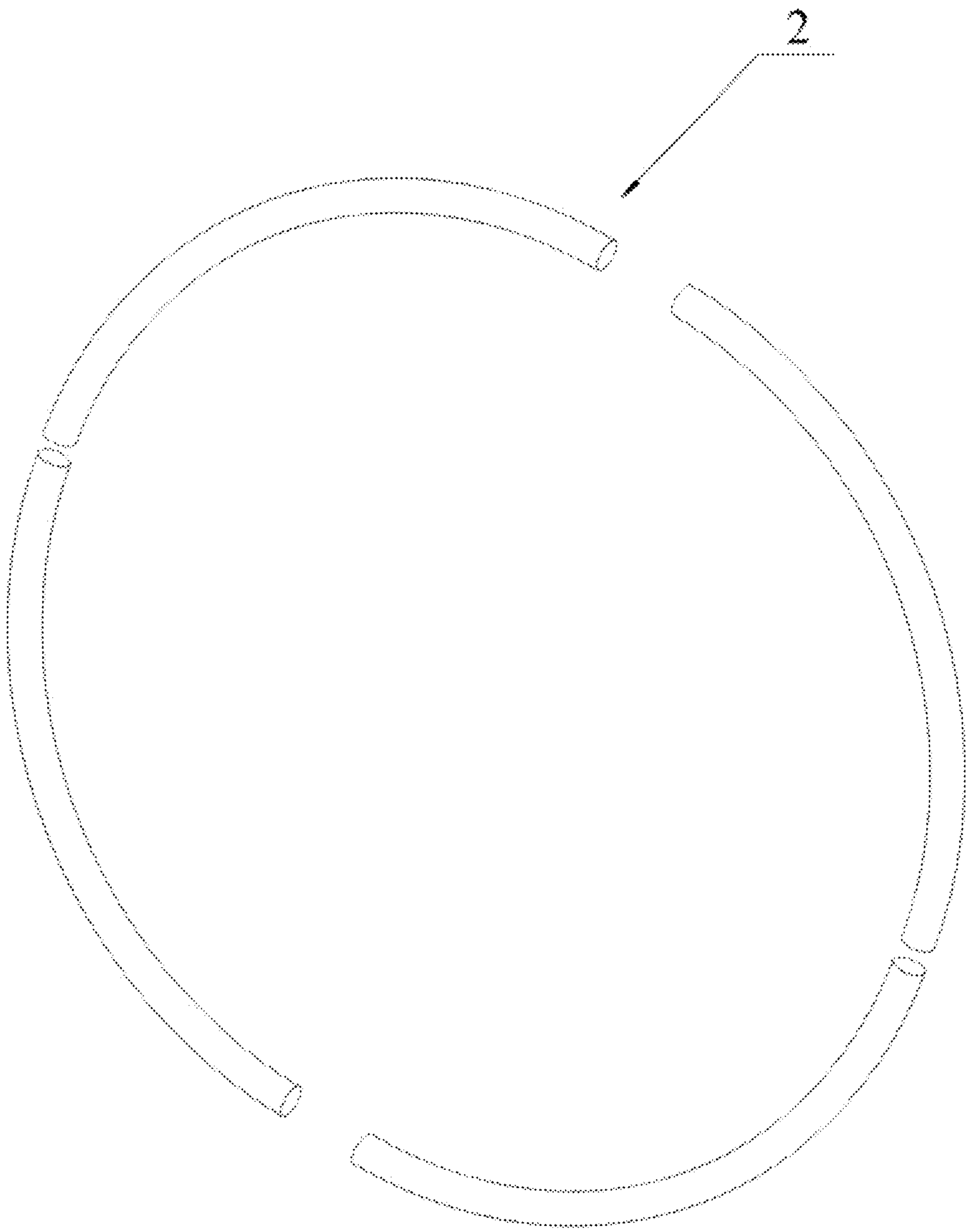
FIG. 6 is another embodiment provided by the present disclosure.
Figure 7:
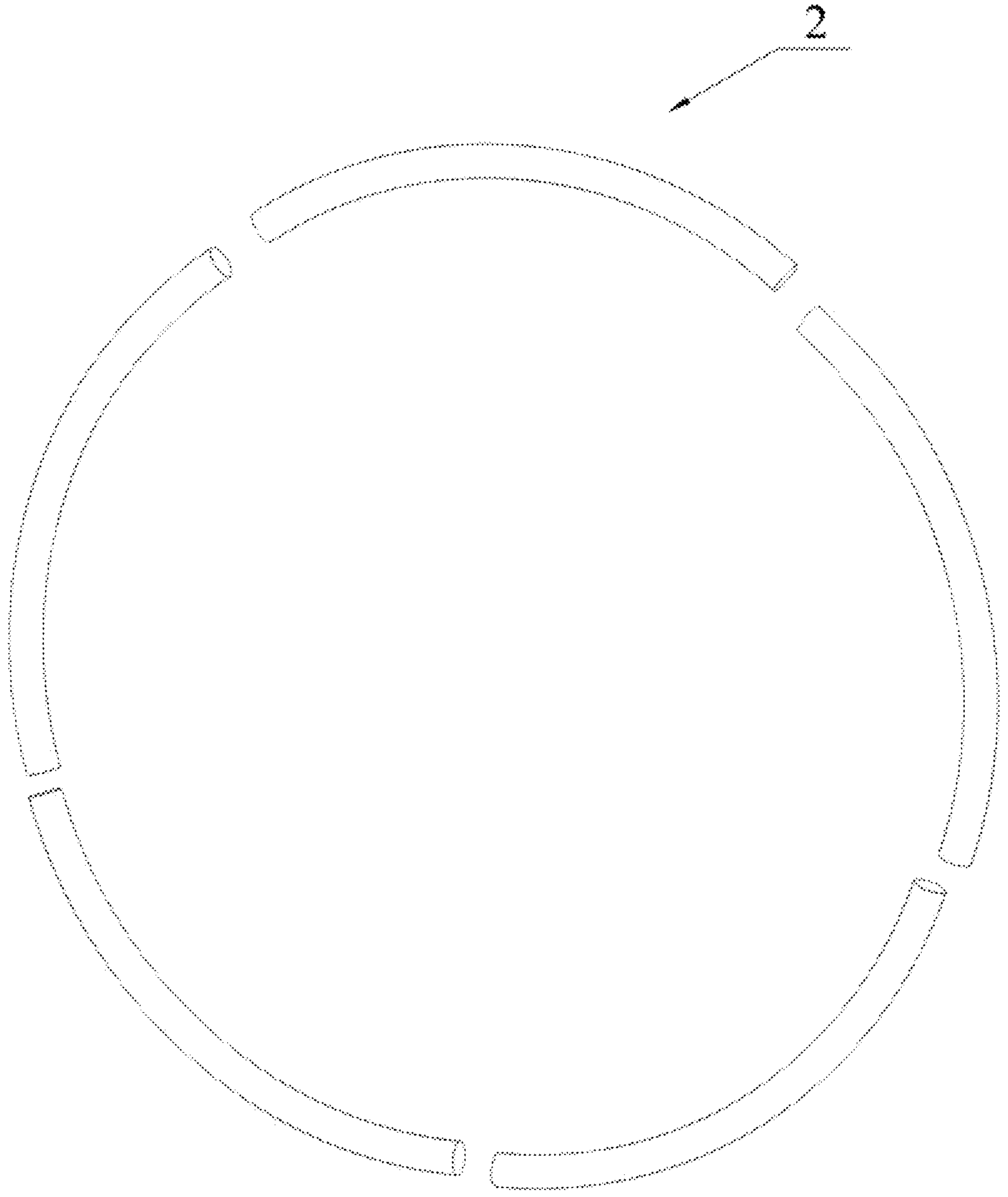
FIG. 7 is another embodiment provided by the present disclosure.
Figure 8:
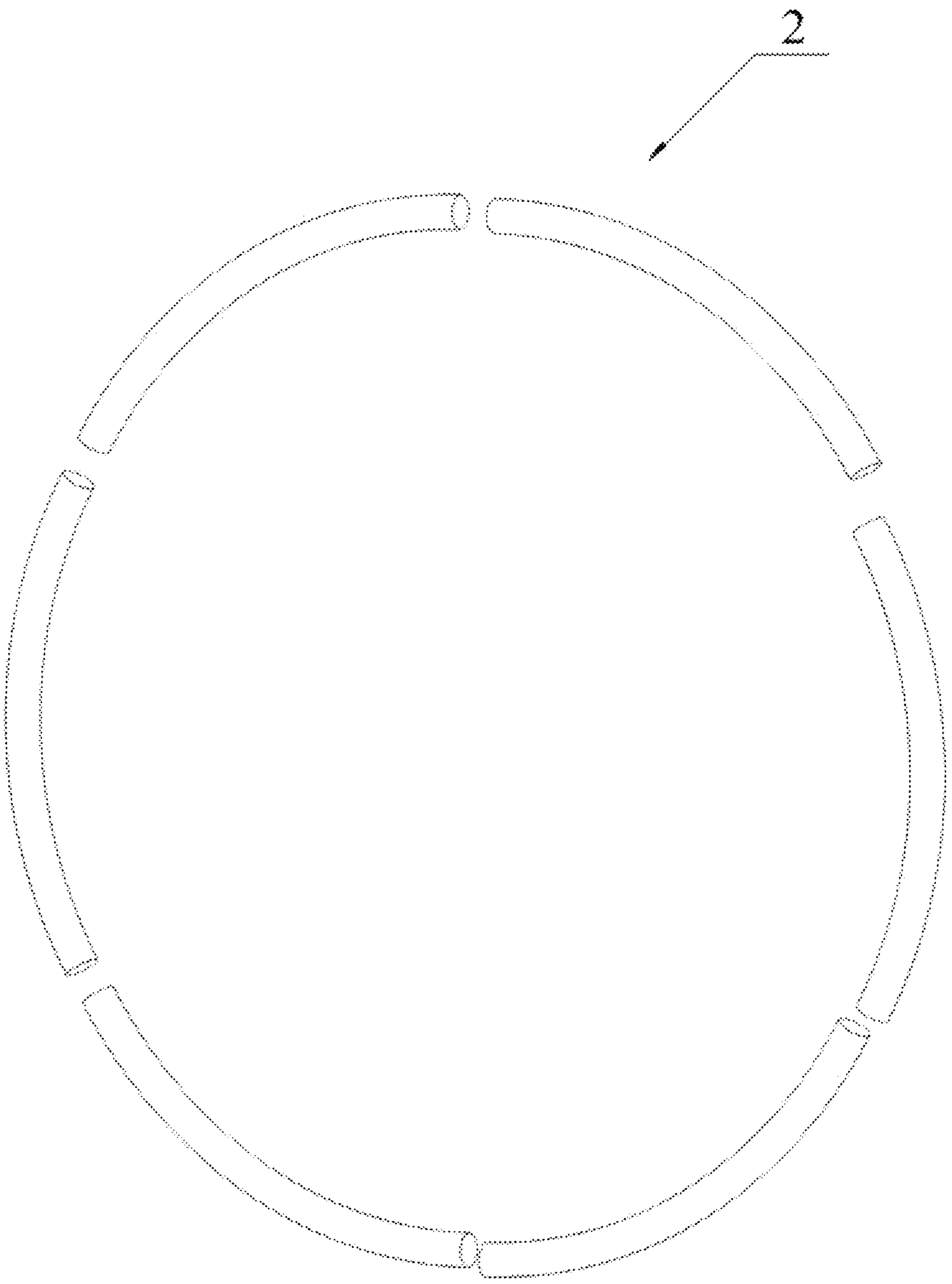
FIG. 8 is another embodiment provided by the present disclosure.

Referring to FIGS. 2 and 4, the fastener 5 is provided with mounting notches for the support bracket 2 and connecting rod 4 to pass through and install. The mounting notches are structured as radial openings along the fastener 5. These notches allow the support bracket to thread into the fastener. Axial openings could easily tear during installation, causing the opening to enlarge. The radial opening structure of the mounting notch minimizes adverse effects on the fastener due to opening size. Moreover, the radial opening effectively restricts the notch size, reducing exposure of the fastener's interior and providing protective benefits. Furthermore, compared to axial openings, radial openings better protect the notch, addressing the issue of axial openings tearing and expanding during assembly.

In other embodiments (not shown), to further enhance reliability, the radial mounting notch may incorporate reinforcing ribs or locally thickened structures on the fastener 5 to distribute concentrated stress during assembly and prevent fatigue crack propagation. For example, the edges of the mounting notch may feature chamfers or fiber-reinforced borders to reduce stress concentration on flexible materials and minimize wear, thereby extending service life. Additionally, anti-detachment stops or built-in limit slots can be installed at the mounting notch, ensuring that the support bracket and connecting rod reach the positioning surface upon insertion and generate slight preload. This achieves both quick insertion and prevention of axial slippage post-assembly while facilitating reverse removal during subsequent maintenance without damaging the main body of the fastener.

Referring to FIG. 3, the end of the connecting rod 4 that wraps around the support bracket 2 is the connecting end 6. The crossbar part of the connecting end 6 is a hollow tubular structure, allowing the support bracket 2 to pass through it, thereby forming an adjustable rotating connection structure between the connecting rod 4 and the support bracket 2. The hollow connecting end 6 of the connecting rod 4 accommodates the support bracket 2, and the gap between the connecting end 6 and the support bracket 2 enables the connecting rod 4 to rotate on the support bracket 2. This allows positional adjustments during assembly to meet fine-tuning requirements, further improving assembly efficiency.

In other embodiments (not shown), to ensure smooth rotation and positioning capability, thin elastic washers or plastic bushings can be placed in the gap between the connecting end 6 and the support bracket 2. This maintains rotatability while providing sufficient friction to prevent positional drift caused by collisions or vibrations during use. The wall of the connecting end 6 can be locally thickened or reinforced with longitudinal ribs to withstand bending moment loads during insertion. Additionally, its inner diameter, tolerance, and material hardness should match the outer diameter and material of the support bracket 2 to avoid loosening or jamming. Furthermore, to achieve angular limitation and reset at predetermined positions, a stop structure (e.g., a detent groove or snap ring) can be added between the connecting end 6 and the connecting rod 4, facilitating subsequent adjustments and resets of the lighting fixture's orientation or angle.

In the preferred embodiment of the present disclosure, the fastener 5 is formed by connecting the ends of a flexible material. The flexible material of the fastener 5 simplifies the subsequent threading of the support bracket 2, improving installation efficiency and effectiveness. Moreover, the lightweight nature of the flexible material ensures the overall weight of the lampshade remains within limits.

The support bracket 2 is preferably a one-piece closed-loop structure with two ends detachably connected. During assembly, the entire support bracket 2 can be gradually threaded through the mounting notch of the fastener 5 until the front and tail ends of the support bracket 2 are brought close to complete the closed-loop splicing. This method significantly speeds up the installation efficiency of the support bracket 2, and the full-segment structure offers superior support stability, facilitating rapid shaping support for the lampshade body 1.

In other embodiments of the present disclosure, as shown in FIGS. 5, 6, 7, and 8, the support bracket 2 is configured to consist of a plurality of connected segments, where the end parts of adjacent support bracket bodies are mutually embedded to form an embedded detachable structure. The support bracket 2 can be designed as a structure composed of 3-6 connected segments. Since the lampshade body 1 is typically a circular or quasi-circular hollow structure, when the support bracket 2 is connected into a closed loop by n segmented bodies (n being an integer between 3-6), the central angle range corresponding to each of the support bracket bodies is 60° to 120°. The specific angle is determined by the value of n. For example, when n is 3, the central angle for each support bracket body is 120°; when n is 4, the central angle is 90°; when n is 5, the central angle is 72°; and when n is 6, the central angle is 60°. This angular design not only facilitates the processing and assembly of an individual support bracket body but also ensures that the closed-loop structure formed by connecting a plurality of support bracket bodies matches the shape of the lampshade body 1, providing uniform and stable shaping support. Additionally, it simplifies the overlapping and fixed installation of the connecting rod 4 on each segment. The support bracket 2, composed of a plurality of connected segments, allows for segmented installation. First, the connecting rod 4 is fitted onto one segment of the support bracket body, which is then threaded through the fastener 5 from one end until it detachably connects with another segment. The detachable connection is embedded, enabling quick plug-and-fit assembly. Compared to threading the entire support bracket through the fastener while simultaneously connecting the rods, segmented installation is more efficient.

In other embodiments of the present disclosure (not shown), the one-segment structure with detachable ends or multi-segment embedded structure of the support bracket 2 may adopt a plug-in end with a guiding conical surface and a self-locking mechanism. This allows for positioning and locking with a gentle push during assembly, while enabling quick separation through a release button or disengagement slot when disassembly is required. The embedded end part can also be equipped with metal or high-strength plastic pins to enhance structural rigidity and withstand cyclic loading. To ensure load-bearing performance after segmentation, the joint should preferably feature engagement ribs or load-bearing surfaces in the force direction, with its shape and material thickness optimized through finite element analysis to prevent fatigue failure at the joint under prolonged use.

As shown in FIG. 3, in the embodiment where the support bracket 2 of the present disclosure adopts a multi-segment body connection, the connecting end 6 is connected to and wraps around the joint between the segmented bodies. By enclosing the exterior of the joint, the connection becomes less prone to detachment, thereby enhancing the overall structural stability of the support bracket and providing a reliable foundation for subsequent connections. The wrapping layer may take the form of a detachable sheath or heat-shrink tubing, with anti-slip textures or adhesive layers designed inside the sheath to further secure the plug-in position. The external wrapping also acts as a stress buffer, dispersing concentrated impacts on the connecting end and reducing the risk of wear and loosening at the end part. Additionally, this wrapping structure conceals gaps at the ends, improving overall aesthetics and tactile feel.

In other embodiments (not shown), to improve the adaptability of the lampshade and modularize production, each section of the support bracket 2 can be designed as a snap-fit telescopic structure. Specifically, a push-and-insert connection is arranged between sections of the support bracket 2, allowing users to thread each section into the fastener 5 as needed and adjust the length of the support bracket by pushing or pulling. A snap-fit device is installed between the sections of the support bracket 2. During installation, once the length of the support bracket 2 is adjusted to the desired position, it is secured through the snap-fit devices to ensure stable length and prevent accidental retraction or extension during use. This design enables the support bracket 2 to accommodate lampshade bodies of different diameters, enhancing the versatility of the lampshade structure and meeting the usage requirements of lighting fixtures of various specifications. It also facilitates modular and batch production, thereby improving production efficiency.

In summary, the present disclosure achieves the following technical effects: The structure of the present disclosure is reasonable and compact. By directly passing the support bracket 2 through the fastener 5 to fix it onto the lampshade body 1, a connection shaping device is formed. This creates an appearance and integrity effect similar to traditional fixed-structure lampshades based on a detachable structure. During the installation process, the connecting rod 4 is simultaneously connected, improving installation efficiency and ensuring the fastener 5 does not easily detach from the lampshade body 1, thereby guaranteeing successful installation. This greatly enhances both assembly and maintenance efficiency and experience. The lampshade body 1 itself is made of a flexible material, significantly reducing space occupation whether for storage, folding, or transportation, with excellent mobility for easy handling, making it suitable for widespread adoption.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A new-type lampshade, comprising:

a lampshade configured as a hollow structure with openings at either end and provided with a mounting base inside for securing a lighting fixture, wherein the mounting base is connected to the lampshade through connecting rods; and the lampshade consists of a lampshade body and a connection shaping device attached to the lampshade body, with the lampshade body being a foldable storage structure made of a flexible material; and the connection shaping device comprises a support bracket and a fastener fixed to the lampshade body, and the fastener is an annular flexible hollow tubular sleeve structure defining a continuous hollow channel extending along a circumference of the lampshade, wherein the fastener is defined by an end-to-end connection of the flexible material; and the support bracket is inserted through a hollow area of the fastener to form a structure that supports and shapes the lampshade body, and the connecting rods are uniformly distributed and detachably connected to the support bracket;

wherein the fastener is provided with mounting notches for inserting and installing the support bracket, the mounting notches are radially open structures along the fastener, and the support bracket is insertable through the mounting notches and extends along the hollow channel to support and shape the lampshade body via the fastener.

2. The new-type lampshade according to claim 1, wherein the mounting notches are configured to receive ends of the connecting rods, and the mounting notches are spaced apart from one another along the fastener.

3. The new-type lampshade according to claim 1, wherein an end of each of the connecting rods connects and wraps around the support bracket at a connecting end with a crossbar part thereof being a hollow tubular structure; and the support bracket passes through the crossbar parts of the connecting ends, allowing each of the connecting rods to form a rotatably adjustable connecting structure on the support bracket.

4. The new-type lampshade according to claim 1, wherein the fastener is formed by head-to-tail connection of a flexible material.

5. The new-type lampshade according to claim 1, wherein the support bracket is a closed-loop structure with two ends detachably connected.

6. The new-type lampshade according to claim 5, wherein the support bracket is composed of a plurality of connected support bracket bodies, with adjacent end parts of the support bracket bodies embedded into each other to form an embedded detachable structure.

7. The new-type lampshade according to claim 6, wherein a connecting end of one of the connecting rods is connected to and wraps around a joint between the support bracket bodies.

8. A new-type lampshade, comprising:

a lampshade body made of a flexible material, configured to be in either a folded storage state or an extended use state;

a fastener made of a flexible material, fixedly attached to the lampshade body, the fastener is an annular flexible hollow tubular sleeve structure that defines a continuous hollow channel extending along a circumference of the lampshade body, wherein the fastener is defined by an end-to-end connection of the flexible material, wherein the fastener has a radial mounting notch for access to the continuous hollow channel;

a support bracket configured to be detachably inserted through the continuous hollow channel of the fastener through the radial mounting notch, thereby supporting and shaping the lampshade body from the folded storage state to the extended use state; and a connecting rod assembly comprising at least one connecting rod, wherein the at least one connecting rod has a connecting end configured to be operably connected with the support bracket when the support bracket is inserted into the fastener, and the connecting rod assembly is configured to support a lighting fixture.

9. The new-type lampshade according to claim 8, wherein the support bracket is configured as a closed-loop structure with two ends detachably connected; and the support bracket comprises a plurality of support bracket bodies, with adjacent segments detachably connected through an embedded connecting structure.

10. The new-type lampshade according to claim 9, wherein a central angle corresponding to each of the support bracket bodies ranges between 80° and 120°.

11. The new-type lampshade according to claim 10, wherein the connecting end is connected to and wraps around a joint between the support bracket bodies.

12. The new-type lampshade according to claim 8, wherein the connecting end comprises a hollow tubular structure configured to be rotatably sleeved on the support bracket.

13. The new-type lampshade according to claim 8, wherein the fastener is formed by end-to-end connection of a flexible material.

14. The new-type lampshade according to claim 8, wherein the connecting rod assembly further comprises a mounting base, for securing the lighting fixture and fixedly connected to the at least one connecting rod.

15. The new-type lampshade according to claim 14, wherein the at least one connecting rod and the mounting base are integrally fixedly connected by welding.

16. A new-type lampshade, comprising:

a lampshade body made of a flexible material and foldable for storage;

a fastener made of a flexible material and fixedly attached to the lampshade body, wherein the fastener is an annular hollow tubular sleeve structure that defines a continuously extending hollow channel extending along a circumference of the lampshade body and is provided with a mounting notch cut along a radial direction thereof, wherein the fastener is defined by an end-to-end connection of the flexible material;

at least one support bracket configured to be detachably inserted through the hollow channel of the fastener through the mounting notch, thereby supporting and shaping the lampshade body; and at least one connecting rod configured to support a lighting fixture;

wherein one end of the at least one connecting rod is provided with a connecting end that is configured to be releasably engaged with the at least one support bracket when the at least one support bracket is passed through the fastener, enabling the at least one connecting rod to be indirectly supported on the lampshade body through the at least one support bracket.

17. The new-type lampshade according to claim 16, wherein the at least one support bracket is configured as a closed-loop structure with two ends detachably connected; and the at least one support bracket consists of a plurality of support bracket bodies, with adjacent support bracket bodies detachably connected through an embedded connecting structure.

18. The new-type lampshade according to claim 17, wherein a central angle corresponding to each of the plurality of support bracket bodies ranges between 60° and 100°.

19. The new-type lampshade according to claim 16, wherein the connecting end is a hollow tubular structure that is rotatably sleeved on the at least one support bracket.

20. The new-type lampshade according to claim 16, further comprising a mounting base for installing the lighting fixture, and another end of the at least one connecting rod away from the connecting end is fixedly connected to the mounting base.

* * * * *